United States Patent [19]

Stanton

[11] Patent Number: 4,605,283
[45] Date of Patent: Aug. 12, 1986

[54] BLACKENED OPTICAL TRANSMISSION SYSTEM

[75] Inventor: Douglas A. Stanton, Ossining, N.Y.

[73] Assignee: North American Philips Corporation, New York, N.Y.

[21] Appl. No.: 780,706

[22] Filed: Sep. 26, 1985

Related U.S. Application Data

[63] Continuation of Ser. No. 567,022, Dec. 30, 1983, abandoned.

[51] Int. Cl.⁴ .............................................. G03B 21/60
[52] U.S. Cl. .................................................... 350/127
[58] Field of Search ........................ 350/123, 127–129; 128/167, 168

[56] References Cited

U.S. PATENT DOCUMENTS

| | | | |
|---|---|---|---|
| 2,378,252 | 6/1945 | Staehle et al. | 350/126 |
| 2,738,706 | 3/1956 | Thompson, Jr. | 350/127 |
| 3,679,451 | 7/1972 | Marks et al. | 350/126 |
| 4,525,029 | 6/1985 | Inoue et al. | 350/128 |

*Primary Examiner*—L. T. Hix
*Assistant Examiner*—Della J. Rutledge
*Attorney, Agent, or Firm*—Joseph P. Abate

[57] ABSTRACT

A blackened optical system includes a transparent substrate having a front side provided with at least a pair of elongate ribs forming therebetween an elongate groove. An amount of optically black discrete particles for absorbing visible ambient light is disposed in the groove. The particle amount is contained within the groove by means of a skin which extends between the ribs and over the groove.

39 Claims, 4 Drawing Figures

BLACKENED OPTICAL TRANSMISSION SYSTEM

This is a continuation of application Ser. No. 567,022, filed Dec. 30, 1983 now abandoned.

BACKGROUND OF THE INVENTION

1. Field of The Invention

The present invention relates to optical transmission systems, and particularly to such systems including a transparent sheet having a front side provided with light-control elements which form grooves.

2. Description of The Prior Art

Such a system is manufactured for example by North American Philips Consumer Electronics Corp. and employs a transparent integral sheet having a front and a rear side.

The sheet includes a transparent substrate having front and rear planar surfaces. The front planar surface is provided integrally with at least a pair of mutually parallel elongated light-control elements or ribs. The ribs are laterally spaced to form an elongated "V" or similarly-shaped valley or groove between them. Each rib is a transparent unitary element having two end surfaces and two side surfaces. Specifically, each rib includes an elongated planar back end surface disposed on the substrate and an elongated curved front end surface disposed opposite the back end. The back and front ends are connected by a pair of elongated opposite side surfaces which extend from the back end and are sloped to converge generally in a direction toward the front end. The side surfaces may be planar, and immediately adjacent side surfaces of respective ribs may be contiguous along the substrate front surface. Each rib is dimensioned such that a light ray entering the system through the rear side and traveling in a direction perpendicular to the substrate front surface (operational light ray) can leave the system only through preselected rib surfaces such as the curved front. Therefore, the remaining rib surfaces (e.g. side surfaces) are designed or preselected not to transmit an operational light ray out of the system.

Such systems may be used to display a small lighted image but typically are expanded to include a plurality of usually identical ribs forming respective grooves so that a larger image is displayable. These expanded systems can be incorporated in a rear projection screen and used to display, on an enlarged scale, a television/motion picture image or the like projected by an image source such as a cathode ray tube/film projector and focused within the system's substrate. See for example, U.S. Pat. No. 3,523,717, issued Aug. 11, 1970, entitled "Composite Back Projection Screen" and U.S. Pat. No. 3,830,556, issued Aug. 20, 1974, entitled "Rear Projection Screen."

When so incorporated the system is oriented such that the ribs are elongated in a (vertical) direction parallel to a viewer who is spaced from the front side and who is watching a projected image focused within the system. The curved front surfaces then function refractively to control the light intensity of the image in a (horizontal) direction transverse of the viewer. Thus, the front surfaces may be convex or any other shape which can accomplish the desired transverse control. Light intensity of the image in a direction parallel to the viewer may be controlled by known diffusion means. For a discussion of various surfaces and diffusers for controlling light intensity, see the previously mentioned U.S. patents.

Because such optical systems, whether or not expanded, are often operated in and exposed to visible ambient light, it is desirable to reduce reflection of such light at the front side of the system. Thus, for example, reduction in the contrast of a projected television image focused in the system is lessened.

This reduction in reflection is accomplished by blackening the operationally optically non-transmissive side surfaces of the ribs. Blackening as defined herein includes providing a means for reducing both specular and diffuse reflectivity at the system's front side for all wavelengths in the visible electromagnetic spectrum. In other words, blackening includes providing a means for absorbing visible ambient light.

Known blackening means include a thin (e.g. 50 microns) light-absorbent layer such as a black ink or grease provided on substantially the entire area of the rib side surfaces forming the groove. As discussed in the previously mentioned U.S. patents, this layer is provided intimately on the side surfaces by painting, rolling or other overcoating techniques well known.

Prior art optical transmission systems including the known blackening means have a major drawback because of undesirable absorptive attenuation of operational light by the black layer intimately contacting the relatively large entire area of the rib side surfaces. This attenuation reduces the transmissive efficiency of the system.

As suggested above, these prior art optical systems utilize refractive principles establishing a condition for the phenomenon of total internal reflection to control the direction of operational light traveling through the system. Generally, this condition is established at the rib side surfaces and is not established at the rib front surface.

When a dense medium (e.g. an acrylic plastic) having a first refractive index $n_1$ interfaces with a second medium (e.g. air) having a second refractive index $n_2$, it follows from Snell's law that a critical angle $\theta_c$ is determined. Specifically, $\theta_c = \arcsin(n_2/n_1)$ so that a light ray traveling within the plastic medium and incident upon the plastic-air interface at an angle $\theta$ greater than the critical angle is totally reflected back into the optically more dense plastic.

Optical systems with known blackening means having the light-absorbent layer in intimate physical and, thus, high optical contact with the rib side surfaces forming the groove, in effect, increase the refractive index of the second medium (previously air) cause a corresponding increase in the critical angle. Therefore, operational light transmitted within prior art systems is more prone to unwanted transmission out of such systems through the side surfaces because the range of angles $\theta$ available for total internal reflection is decreased.

SUMMARY OF THE INVENTION

It is a principal object of the present invention to avoid the prior art drawback by providing an optical system which simultaneously maintains total internal reflective control of operational light and effective absorption of ambient light.

It is an additional object of the present invention to provide an optical system which effectively absorbs ambient light and simultaneously substantially maintains the system's critical angle.

It is another object of the present invention to provide a blackened optical system having a transmissive efficiency improved over prior art systems.

An optical transmission system according to the present invention avoids the drawback of the prior art by comprising tiny (preferably a size of not less than 0.5 microns diameter) black discrete particles each including at least one light-absorbent substance. An amount (discussed below) of particles is disposed loosely within the groove formed between the laterally spaced ribs so that an outer portion of the particles is located at a position generally remote from the substrate rear surface.

Accordingly, the discrete particles must have a chemical composition such that each particle is highly absorbent to visible ambient light. Further, each of the particles must have a shape such that each particle disposed immediately adjacent to the groove-forming rib surfaces makes minimal physical (e.g. point) contact and, thus, minimal optical contact with those surfaces. Preferably, the loose particles are round or have otherwise curved shapes. The size of each particle is not critical although should be sufficiently small so that the amount is easily disposable within the groove. Preferably, each particle has a size in a range between approximately 0.5 and 20.0 microns diameter so as to permit the easy disposability and, also, an essentially total absorption of visible light incident upon each particle. A number average particle size of approximately 10 microns diameter is desirable.

The particles are contained within the groove by means of a durable, pliable outer layer or skin which is attached continuously along and is extended continuously between the respective rib side surfaces so that the skin is disposed over and contains the particles.

This outer skin may be, for example, a thin elongate transparent film formed of an easily cured thermoplastic or other resinous material applied in a fluid state onto the outer portion of particles by known application techniques. See the *Modern Plastics Encyclopedia*, 1983–1984, (McGraw-Hill, Inc., 1983) for detailed discussions of various transparent plastic films and their respective methods of application. The cured transparent skin is pliable, durable and permits the underlying loose black particles to absorb the ambient light.

Desirably, however, the skin has a chemical composition and a thickness to present a highly (preferably totally) absorbent surface to the ambient light. Thus, the preferred embodiment of the present invention includes a skin comprising the outer portion of the disposed black particles. Preferably, therefore, the particles are thermally and/or chemically fusible without adversely affecting the transparent sheet in order to permit an efficient formation of the outer skin.

For example, round-shaped particles each having a diameter of approximately 10 microns and including carbon black and/or other black substances provided (such as by suitably mixing or blending) with a thermoplastic or an otherwise fusible polymer material may be used. Dry toner powders used in electrophotographic recording processes work especially well. See U.S. Pat. Nos.: 3,639,245 and 4,262,077 which both disclose very satisfactory heat and chemically fusible dry powders. Of course, the disposed particle amount may include individual particles having non-identical chemical compositions.

One method for forming the black skin includes applying heat energy directly and precisely at the outer portion of particles and simultaneously at the rib surfaces which physically contact the relevant particles of that portion. This heat energy must have a wavelength, an intensity and an application time sufficient for causing the fusible materials of the outer portion of particles to fuse not only to each other but also to respective parts of the rib side surfaces. Upon cooling, the outer portion forms a durable black skin bonded to relatively small surface areas of the respective rib sides.

Alternatively, the black skin is formed by momentarily contacting the outer portion of particles with a chemical solvent liquid or solvent vapor adequate for fusing the particles. Upon removing the liquid or vapor, a durable light-absorbent skin bonded to the rib side surfaces is formed.

In all of the aforementioned methods for forming the black outer skin, the underlying particles (i.e. an underlying multiplicity of particles) remain loose and mechanically support the overlying outer skin. Further, the optical contact between the loosely disposed particles and the rib surfaces is so minimal that the critical angle at the rib-air interface is substantially unaffected by these particles. The black skin, although having an average thickness (usually essentially uniform) which provides a higher than minimal optical contact with the relevant rib surfaces, has been found not to affect significantly the overall optical performance of the system. The average thickness of the skin preferably is approximately four to nine times the number average size of the particles disposed in the groove.

A method of blackening an optical system includes providing a substrate having a front surface provided with at least a pair of elongate mutually parallel optical elements, each element having opposite side surfaces, the elements being laterally spaced such that respective side surfaces form a groove between the elements; disposing, in the groove, an amount of light-absorbent discrete particles, and then containing the particles within the groove. Because of the minimal optical contact, the amount of discrete particles ultimately disposed (i.e. present in the groove immediately after the containing step) depends primarily only upon a system design requirement to present a black surface of relatively large area to the ambient light.

Further and still other objects of the present invention will be more readily apparent in light of the following description when taken in conjunction with the accompanying drawing.

DESCRIPTION OF THE PREFERRED EMBODIMENT

Transparent Sheet

Figure 1:
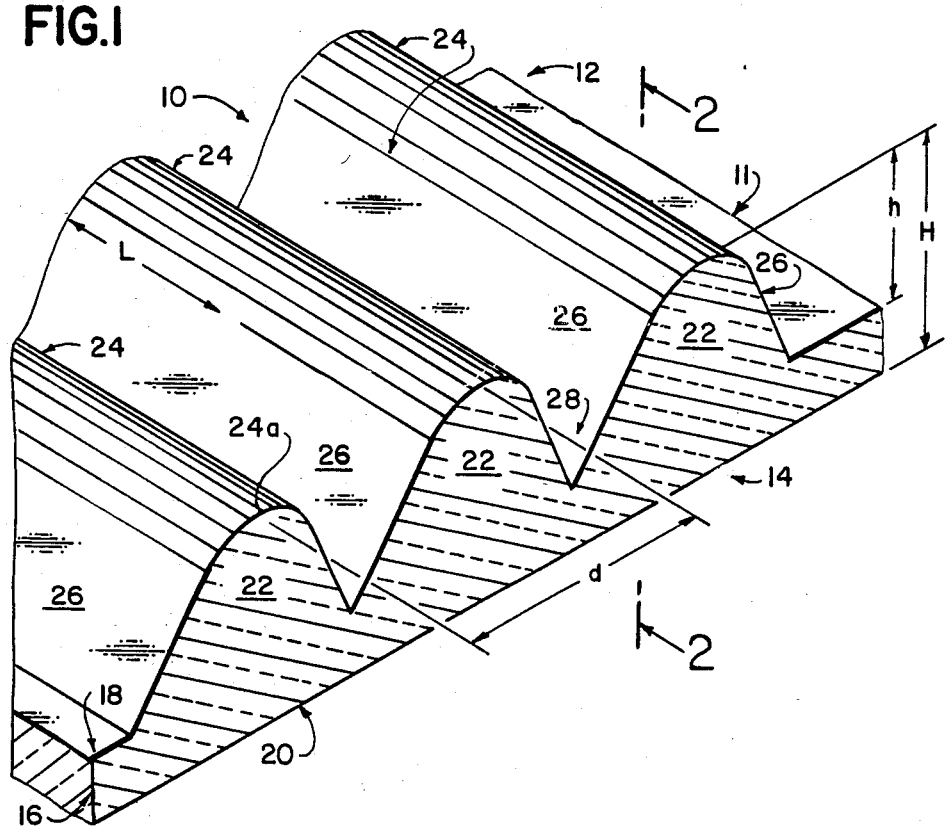
FIG. 1 is a perspective partial cross-sectional view, on an enlarged scale with rib curvatures and heights exaggerated for clarity, of an optical system prior to disposing the black discrete particles of the present invention.

FIG. 1 shows an optical system 10 prior to disposing the absorbing means. System 10 includes a transparent unitary sheet 11 having a front side 12 and a rear side 14.

The sheet 11 may be formed from any suitable transparent medium, for example, a polymethylmethacrylate which has a refractive index $n_1$ equal to 1.49.

The sheet includes a substrate 16 having a front planar surface 18 and a rear planar surface 20. At least one pair of elongated mutually parallel identical ribs 22 is disposed on the front surface 18. Each rib 22 comprises an elongated planar back end surface (not shown) and an elongated curved front end surface 24 having an apex 24a. Each rib further comprises a pair of steep opposite side surfaces 26 which connect the back end to the front end 24. The sides 26 of each rib are oppositely constantly sloped at equal angles $\beta$ (FIG. 4) to converge toward and terminate in the front end 24.

As shown, the ribs 22 are successively laterally adjacent and the adjacent side surfaces 26 are contiguous at the substrate surface 18. Each rib 22 is laterally spaced from an adjacent rib so that the respective surfaces 26 form between them an elongated "V"-shaped groove 28. Typically, such as for projection screen applications, the sheet 11 is large (e.g. having an area of about twelve square feet) and is formed or provided with a large plurality of mutually parallel ribs 22 which form respective grooves 28 between them. The sheet may then be cut, for example, by sawing to any desired size after disposing and containing the absorbing means (discussed below).

The sheet 11 has a height H of approximately five mm as measured from the rear surface 20 to the apex 24a of the curved front surface 24, while each rib 22 has a height h which is approximately two mm. The center to center distance (pitch) d between ribs is approximately one mm. Each surface 24 is convex having a radius of curvature of approximately two-tenths mm. Of course, dependent upon the particular system application, rib front surfaces 24 may have any desired shape (e.g. concave) for controlled transmission of light out of the system 10, and may or may not be all identically shaped. The ribs 22 may have any desired length L dependent again upon the particular application of the system 10.

Figure 4:
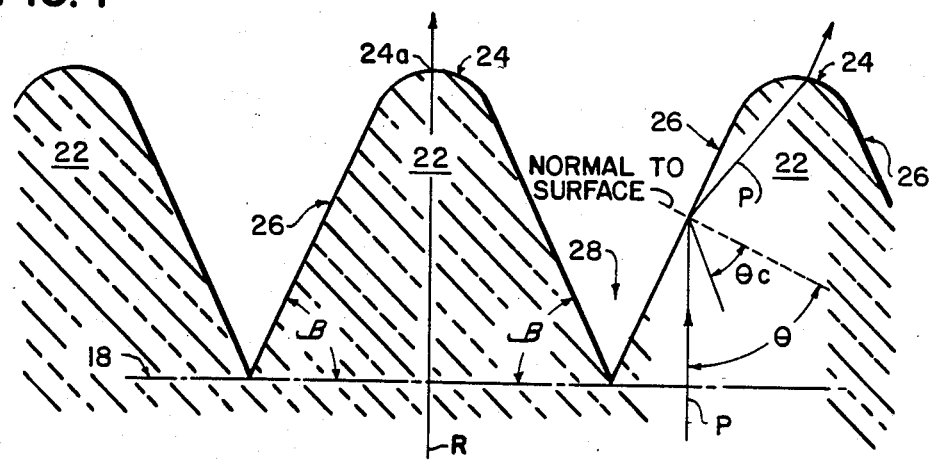
FIG. 4 is a diagram explaining the phenomenon of total internal reflection.

Referring now also to the explanatory diagram of FIG. 4, the side surfaces 26 for each rib 22 are substantially planar and make equal and opposite angles $\beta$ with the planar surface 18 (dotted and dashed line) of the substrate 16. As known to those skilled in the art, the angles $\beta$ are chosen to select the surfaces of the rib 22 from which operational light rays R, P entering the system 10 through the rear side 14 in a direction perpendicular to the surface 18 can exit the sheet 11. More specifically, in order to control the directions of the light rays R, P traveling through the system 10, the angles $\beta$ are chosen such that they establish the conditions for total internal reflection at the side surfaces 26. These conditions are so established when each angle $\beta$ is in a range between approximately 43° and 85°; the particular value being a matter of design choice.

In this embodiment, the ray R is transmittable (undeflected) out of the system through the apex 24a of the convex front surface 24. The planar side surfaces 26 are sloped ($\beta = 65°$) such that they are optically non-transmissive for an operational ray P traveling parallel to the ray R and being incident upon the surface 26 (i.e. air-rib interface) at an angle $\theta$ greater than the critical angle $\theta_c$ (e.g. $\theta_c = 42°$). Such rays P are totally reflected back into the sheet 11 and ultimately leave the system 10 through the front surface 24 as shown.

Absorbing Means

Figure 2:
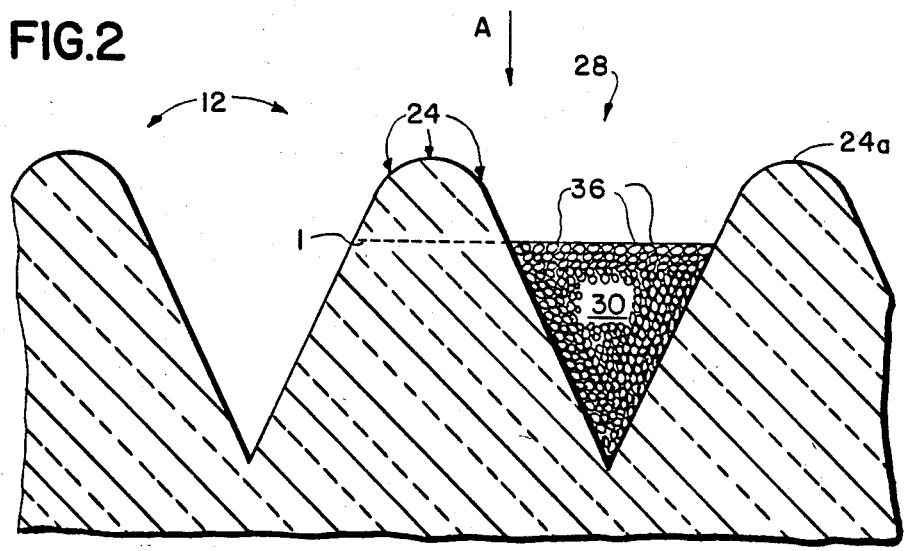
FIG. 2 is a view taken through the line 2—2 of FIG. 1 after disposing the particles.

In order to reduce reflection of ambient light at the front side 12 and to increase correspondingly the contrast of operational light rays P,R as viewed in a direction facing the front side 12, an amount of light-absorbent discrete particles 30 (FIG. 2) is disposed in the groove 28. The disposed amount should be sufficient to present a black surface having a large area for absorbing ambient light A without covering any rib surfaces 24 designed for passing operational light. Thus, for example, the particles 30 may fill the groove 28 for approximately 75% of the height h to a level 1 so that an outer portion 36 of particles is located between the ribs 22 at a position generally remote from the rear surface 20.

Each particle must have a highly light-absorbent chemical composition, and should have dimensions (size) such that each substantially totally absorbs visible ambient light impinging upon that particle. Preferably, each particle is round and has a size in a range between approximately 0.5 and 20 microns diameter with 10 microns diameter being a number average particle size. Each particle 30 preferably comprises carbon black and/or another black substance provided with a polymer material (e.g. a thermoplastic) fusible without damaging the sheet 11.

For example, and not by way of limitation, a common electrostatic photocopy machine toner powder manufactured by the 3M Company and marketed under the name "ESP Toner" may be used with the polymethylmethacrylic sheet 11. Each particle of such toner powder is heat fusible in a range of 80° to 115° C., spherically-shaped and has the following dimension and chemical composition (by weight):

Number average size—10 microns diameter;

Composition—25 to 70 percent of a thermoplastic binder material (e.g. a mixture of polystyrene and a polyolefin/vinyl acetate copolymer), 30 to 75 percent of a magnetically permeable component (e.g. magnetite) and 0.5 to 2.0 percent of a conductive carbon.

The binder, magnetic component and carbon are suitably blended together to form the dry toner particles as disclosed in the previously mentioned U.S. Pat. No. 4,262,077.

Of course, each particle may be formed entirely of any blackened thermoplastic material or other heat-/chemically-fusible blackened material. Further, the amount of groove disposed particles may contain individual particles whose respective chemical compositions are not identical although light-absorbent.

The particles 30 are disposed in the groove 28, for example, by dumping or otherwise applying a sufficiently large quantity of particles on the front side 12 so that a quantity of the particles is disposed within the groove. Undesirably disposed particles (those on the front surfaces 24, and those within the groove 28 and above the level 1) may then be removed by a suitable wiping operation. For example, a brush (not shown) may be moved simultaneously along the front and side surfaces 24, 26 so that the undesired particles are pushed off the sheet 11. The brush should have bristles positioned and dimensioned such that the moving brush not only wipes the surfaces 24 but also removes part of the particle quantity down to the level 1. As a result, the desired amount of particles is easily disposed within the groove 28.

Containing Means

Figure 3:
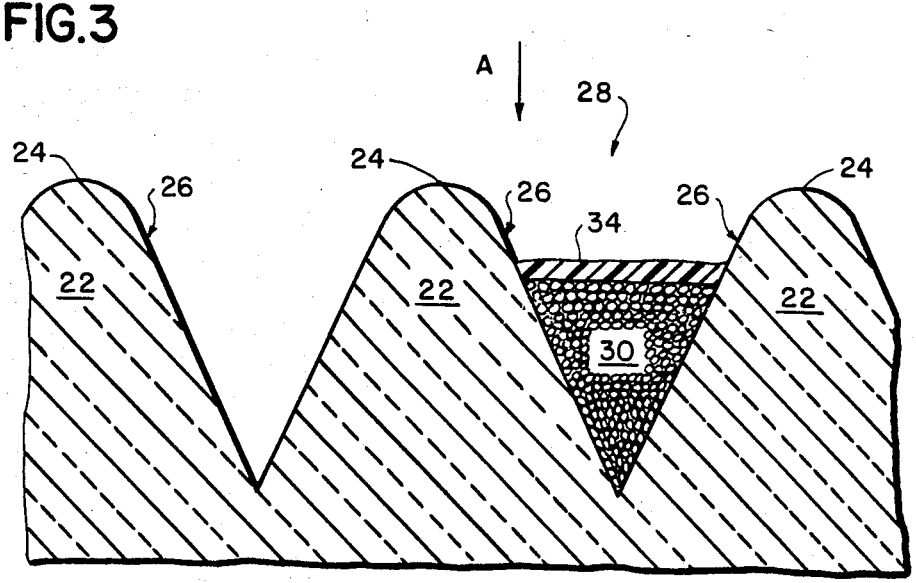
FIG. 3 is a view similar to that of FIG. 2 after containing the disposed particles.

As shown in FIG. 3, the disposed particles are contained within the groove 28 by a front outer skin 34 which is attached to the respective sides 26 forming the groove 28. The skin 34 may be formed of a thin transparent thermoplastic material such as an acrylic plastic applied by means of known techniques; see the *Modern Plastics Encyclopedia*, pages 14-18. Preferably, however, the skin 34 is black and comprises a fused outer portion of the groove disposed particles 30. Also, the black skin 34 desirably has an average thickness in a range between approximately 40 and 90 microns. This thickness, typically, is essentially uniform although it may be variable within the range.

Fusing an outer portion 36 of the disposed black particles (FIG. 2) can be accomplished in several ways without adversely affecting the transparent sheet 11. Suitably directed heat lamps (not shown; for example, flash lamps) can apply, to the front side 12, an intense heat of a suitable wavelength for selectively acting on the outer portion 36 so that those particles are fused to each other and to the surfaces 26. Upon removing the heat, the fused particles form the black skin 34 disposed over the groove 28 and attached to the surfaces 26. The intensity and duration of the applied heat affect the thickness of the skin 34.

Alternatively, appropriate chemical solvents or solvent vapors, for example, a trichloroethylene ($C_2HCl_3$) vapor may be momentarily contacted with the outer particles 36 (e.g. "ESP" toner) to form a desirable black outer skin. As is well known to those skilled in the art, a suitable vapor degreaser may be utilized to contact the vapor with the particles.

Significantly, the underlying discrete particles 30 (i.e. an underlying amount) provide minimal physical and, thus, minimal optical contact with the side surfaces 26. These particles 30 do not significantly affect the critical angle $\theta_c$ for the ribs 22 interfacing with an air medium ($n_2 \cong 1$). Thus, total internal reflection of light at the air-rib interface is desirably maintained while the system 10 presents a highly absorbent surface 34 to the ambient light.

Finally, although the black outer skin 34 provides more than a minimal optical contact with the relevant side surfaces 26, it has been found by the inventor not to affect significantly the system's overall performance.

While there has been shown and described what is at present considered the preferred embodiment of the blackened optical system according to the present invention, it will be understood by those skilled in the art that various changes and modifications may be made therein without departing from the spirit and scope of the invention as defined by the appended claims.

For example, in the case of an outer skin which is transparent, non-fusible black discrete particles may be used. Also, in the case of either a transparent or black skin, the particles may have any irregular or asymmetrical shape provided that the required minimal contact contact with the rib side surfaces is maintained.

What is claimed is:

1. An optical transmission system, comprising:
a transparent substrate having a front surface;
a pair of elongated mutually parallel transparent ribs provided on the front surface, the ribs being laterally spaced to form a groove therebetween, and
means for absorbing visible light, the means comprising an amount of light-absorbent discrete particles disposed in the groove, the amount being disposed such that the discrete particles disposed immediately adjacent to the transparent ribs are loose, whereby reflection of visible ambient light impinging on the system is reduced.

2. A system as claimed in claim 1, further comprising means for containing the particles within the groove, the containing means including a layer comprising fused light-absorbent particles.

3. A system as claimed in claim 1, wherein each particle has a size in a range between approximately 0.5 and 20 microns diameter.

4. An optical transmission system, comprising:
a substrate having a planar front surface;
a plurality of elongate mutually parallel ribs provided on the front surface, the ribs being successively laterally adjacent, each rib being laterally spaced from a successively adjacent rib to form a respective groove therebetween, and
means for absorbing visible light, the means comprising an amount of light-absorbent discrete particles disposed loosely in each groove, whereby reflection of visible ambient light impinging on the system is reduced.

5. A system as claimed in claim 4, wherein each particle comprises a fusible material.

6. A system as claimed in claim 5, further comprising means for containing the particles within the grooves, the containing means including a black layer disposed in each groove, the layer comprising light-absorbent particles.

7. A system as claimed in claim 6, wherein each layer consists essentially of light-absorbent particles.

8. An optical transmission system, comprising:
a substrate having a planar front surface and a rear surface opposite the front;
a pair of elongated mutually parallel ribs provided on the front surface and interfaced with a surrounding medium, the ribs being laterally spaced to form a groove therebetween, the ribs being formed of a transparent medium having a first refractive index, the surrounding medium having a second refractive index, the first and the second refractive indexes determining a critical angle $\theta_c$ for a total internal reflection of a light ray transmitted through the rear surface and incident upon the interface between a rib and the surrounding medium; and
means, for absorbing visible light, the means including an amount of light-absorbent discrete particles disposed loosely within the groove, whereby the critical angle $\theta_c$ is essentially unaffected by the particles.

9. An optical transmission system, comprising:
a transparent substrate having a front surface;
a pair of elongated mutually parallel transparent ribs provided on the front surface, the ribs being laterally spaced to form a groove therebetween; and
means, for absorbing visible light, the means comprising a light-absorbent skin extending between the ribs and over the groove, the skin being spaced from the front surface, whereby reflection of visible ambient light impinging on the system is reduced.

10. A system as claimed in claim 9, wherein the skin is formed by disposing an amount of black discrete fusible particles within the groove, and then fusing an outer portion of the disposed particles to form the skin.

11. A system as claimed in claim 10, wherein the particles have a number average particle size of approximately 10 microns diameter.

12. A system as claimed in claim 9, wherein the skin has an average thickness in a range of approximately 40 and 90 microns.

13. A method of blackening an optical transmission system, comprising:
providing a transparent sheet having a plurality of mutually parallel grooves formed in a front side thereof, and
applying black discrete particles to the front side so that a respective amount of particles is disposed loosely in each groove.

14. A method as claimed in claim 13, further comprising containing the particles within respective grooves.

15. A method as claimed in claim 14, wherein the containing step includes fusing a portion of the disposed particles to form a skin in each groove.

16. A method of blackening an optical transmission system, comprising:
providing a substantially planar substrate having a plurality of elongate mutually parallel ribs provided on a surface of the substrate, the ribs being successively laterally adjacent, each rib being laterally spaced from a successively adjacent rib to form a respective groove therebetween,
disposing an amount of light-absorbent discrete particles loosely in each groove, and
containing the particles within respective grooves.

17. A method as claimed in claim 16, wherein the containing step includes fusing a portion of the particles disposed in each groove to form a skin extending between respective ribs.

18. An optical transmission system, comprising:
a transparent substrate having a front surface;
a pair of elongated mutually parallel transparent ribs provided on the front surface, the ribs being laterally spaced to form a groove therebetween, the groove containing an optical medium having a refractive index $n \simeq 1$; and
means for absorbing visible light, the means comprising a multiplicity of light-absorbent discrete particles disposed in the optical medium contained by the groove, whereby reflection of visible ambient light impinging on the system is reduced.

19. A method of blackening an optical transmission system as claimed in claim 15, wherein fusing the portion of the disposed particles includes heating the portion.

20. A method of blackening an optical transmission system as claimed in claim 15, wherein fusing the portion of the disposed particles includes contacting the portion with a solvent.

21. A method as claimed in claim 20, wherein the solvent is trichloroethylene.

22. An optical transmission system as claimed in claim 1, 8 or 18, wherein the light-absorbent discrete particles disposed immediately adjacent to the ribs have shapes providing minimal optical contacts with the ribs.

23. An optical transmission system as claimed in claim 4, wherein, for each of the grooves, the light-absorbent discrete particles disposed immediately adjacent to the ribs have shapes providing optical contacts with the ribs.

24. A system as claimed in claim 22, wherein the ribs are contiguous along the front surface.

25. A system as claimed in claim 23, wherein each rib is contiguous with the successively adjacent rib.

26. A system as claimed in claim 24, wherein the shapes are round.

27. A system as claimed in claim 25, wherein the shapes are round.

28. A system as claimed in claim 1, 8 or 18, further comprising means for containing the particles within the groove, the containing means including a transparent film which is attached continuously along and is extended continuously between the ribs.

29. A system as claimed in claim 1, 8 or 18, further comprising means for containing the particles within the groove, the containing means consisting essentially of fused light-absorbent particles.

30. A system as claimed in claim 4, further comprising means for containing the particles within the grooves, the containing means including transparent films attached continuously along and extending continuously between respective ribs.

31. A system as claimed in claim 28, wherein the film includes a thermoplastic material.

32. A system as claimed in claim 30, wherein each film includes a thermoplastic material.

33. A system as claimed in claim 22, wherein each of the particles includes carbon black provided with a fusible polymer material.

34. A system as claimed in claim 23, wherein each of the particles includes carbon black provided with a fusible polymer material.

35. A system as claimed in claim 1, 8 or 18, wherein each light-absorbent discrete particle is a particle of an electrostatic photocopy machine toner powder.

36. A system as claimed in claim 4, wherein each light-absorbent discrete particle is a particle of an electrostatic photocopy machine toner powder.

37. A system as claimed in claim 22, wherein the light-absorbent discrete particles have respective chemical compositions which are not identical although light-absorbent.

38. A system as claimed in claim 23, wherein the amount includes particles having respective chemical compositions which are not identical although light-absorbent.

39. An optical transmission system, comprising:
a transparent substrate having a planar front surface;
a plurality of elongate transparent ribs provided on the front surface, the ribs being successively laterally adjacent, each rib being laterally spaced from a successively adjacent rib to form a respective groove therebetween;
a multiplicity of light-absorbent discrete particles disposed loosely in each groove, the discrete particles having shapes such that the discrete particles disposed immediately adjacent to the ribs provide minimal optical contacts with the ribs; and
a light-absorbent skin disposed in each groove, the skin extending between the ribs and over the multiplicity of discrete particles, the skin having a chemical composition consisting essentially of that of the discrete particles disposed loosely in the groove, whereby reflection of visible ambient light impinging on the system is reduced.

* * * * *

UNITED STATES PATENT AND TRADEMARK OFFICE
CERTIFICATE OF CORRECTION

PATENT NO. : 4,605,283
DATED : August 12, 1986
INVENTOR(S) : Douglas A. Stanton

It is certified that error appears in the above-identified patent and that said Letters Patent is hereby corrected as shown below:

IN THE CLAIMS

Claim 4, line 3   delete "mutually parallel"

Claim 7, line 2   before "light" insert --fused--

Claim 23, line 4  after "providing" insert --minimal--

Signed and Sealed this

Twenty-second Day of November, 1988

Attest:

DONALD J. QUIGG

*Attesting Officer*          *Commissioner of Patents and Trademarks*